Feb. 23, 1954 R. W. GILBERT 2,670,460

SUBAUDIO ELECTRICAL FILTER

Filed Jan. 9, 1951

Inventor:
Roswell W. Gilbert,
By
Pierce, Scheffler + Parker,
Attorneys.

Patented Feb. 23, 1954 2,670,460

UNITED STATES PATENT OFFICE 2,670,460

SUBAUDIO ELECTRICAL FILTER

Roswell W. Gilbert, Montclair, N. J., assignor to Weston Electrical Instrument Corporation, Newark, N. J., a corporation of New Jersey Application January 9, 1951, Serial No. 205,126

3 Claims. (Cl. 333—71)

This invention relates to sub-audio filters for inclusion in electrical networks and more particularly to filters including elements having the general characteristics of direct current measuring instruments and which have an effective transmission in sub-audio ranges far below those which can be attained with electrical impedances of commercially practical values.

It is common practice to transmit a plurality of communications or signals over a single electrical channel, for example to transmit alternating current signals of different audio frequencies over a conventional 60 cycles per second power distribution system selectively to energize switch equipment at remotely located sub-stations. The several signals of different audio frequencies are diverted from the distribution system and into their individual control circuits by means of electrical wave filters or sensitive relays resonant at an audio frequency. Such tuned relays are not sensitive at low and sub-audio frequencies, and it is neither practical nor possible to construct an electrical wave filter for use at sub-audio frequencies of the order of, for example, one cycle per second. At low frequencies, for example one cycle per second, inductors of practical dimension have too low a Q factor (ratio of reactance to resistance) for reasonably narrow band widths because of the relatively high required inductance. For instance, a 50 henry inductor having a Q of 50 at one cycle per second would weigh hundreds of pounds.

It is known that, in general, all electrical, mechanical and thermal systems, and combinations thereof, have exact analogs in terms of each other because they follow the same fundamental laws. The mathematical analysis of an electrical network which includes an electromechanical element may be conveniently carried out by expressing the element in terms of an equivalent electrical sub-network, and this technique has been used quite extensively in physics. It is common practice, for example, to express devices such as sound transducers, vibrators and other electromechanical elements in terms of their equivalent networks.

Objects of the present invention are to provide sub-audio electrical filters in which the equivalents of inductors and capacitors of impractically high values are furnished by electromechanical devices. Objects are to provide sub-audio electrical filters in which direct current instruments afford high selectivity at frequencies of and below about 10 cycles per second. More specifically, an object is to provide a sub-audio filter including a pair of mechanical oscillatory systems resonant at the same frequency and coupled through a spring of low torque, whereby the filter has the characteristics of a flat-topped band pass filter with sharp cutoff. A further specific object is to provide a relay resonant at a sub-audio frequency and comprising an oscillating mass carrying a contact arm and coupled by a spring to the moving system of a direct current instrument.

These and other objects and the advantages of the invention will be apparent from the following specification when taken with the accompanying drawings, in which:

Figs. 1*a* and 1*b* are idealized or schematic elevation and plan views, respectively, of a permanent magnet-moving coil instrument such as employed in embodiments of the invention;

Figure 1A:
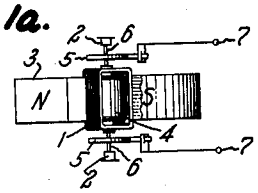
Figure 1B:
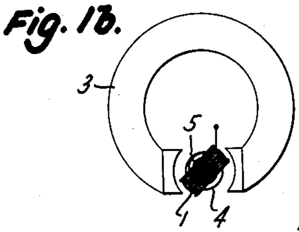

In Figs. 1*a* and 1*b* of the drawings, the reference numeral 1 identifies the moving coil of a permanent magnet-moving coil electrical instrument such as commonly employed for the measurement of direct current and direct current voltages, the coil being supported in jewel bearings 2 for angular displacement in the gaps between the polar faces of a permanent magnet 3 and the adjacent surfaces of a soft iron core 4. The inner ends of spiral springs 5, 5 which return the coil to a preselected position in the absence of a coil current are anchored to the staffs 6, 6 and constitute circuit connections between the coil 1 and the instrument terminals 7, 7.

Figure 2:
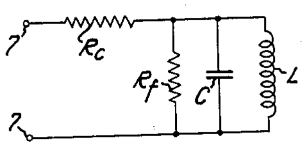
Fig. 2 is a circuit diagram of an equivalent electrical network.

The operation of the instrument as an element of a filter for sub-audio frequencies can be best understood by considering the frequency selectivity of the equivalent electrical network, Fig. 2, in which the inductance L represents the compliance U of the springs 5, 5, the capacitance C represents the moment of inertia M of the moving system, the shunt resistance $R_f$ represents the losses both frictional and electrical of the moving system, and the series resistance $R_c$ represents the direct current resistance measured at the instrument terminals.

The mechanical parameters of moment of inertia and spring compliance are related to their electrical equivalents by the flux linkage constant F of the mechanism, as $$LC = MU \quad (1)$$

$$L/C = \frac{UF^4}{M} \quad (2)$$

from which $$L = UF^2 \quad (3)$$

and $$C = \frac{M}{F^2} \quad (4)$$

wherein the constant F is the product of the movable coil area (A), the number of coil turns (N) and the magnetic flux density (B):

$$F \equiv BAN \quad (5)$$

When considering the circuit as a filter having frequency selectivity, it is useful to consider the ratio of the circulating energy to the input energy required to maintain the circulating energy, the conventional "Q" factor. In such a parallel resonant circuit:

$$Q \equiv \frac{R_f}{W_0 L} = R_f W_0 C = R_f (L/C)^{-\frac{1}{2}} \quad (6)$$

wherein $W_0$ is the undamped resonant frequency of the system;

$$W_0 \equiv (LC)^{-\frac{1}{2}} \quad (7)$$

The natural resonant frequency $W_n$ is related to the undamped resonant frequency $W_0$ as $$\frac{W_n}{W_0} = \left[1 - 1/4Q^2\right]^{\frac{1}{2}} \quad (8)$$

From (8) it is apparent that for values of Q in the order of 10 or higher $W_n$ and $W_0$ are virtually equal, which is usually the case.

Figure 3:
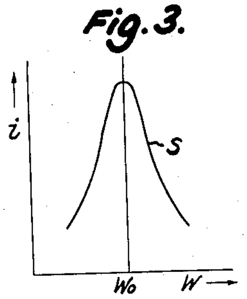
Fig. 3 is a graph showing the frequency selectivity of the network.

The selectivity of the parallel resonant circuit is a function of Q as:

$$\frac{i_0}{i} = \left[1 + Q^2\left[\frac{W}{W_0} - \frac{W_0}{W}\right]^2\right]^{\frac{1}{2}} \quad (9)$$

wherein $i$ is the circulating current at frequency W, relative to the current $i_0$ which would circulate at frequency $W_0$. The selectivity is qualitatively that of a single resonant circuit, as shown by curve S of Fig. 3.

Figure 4:
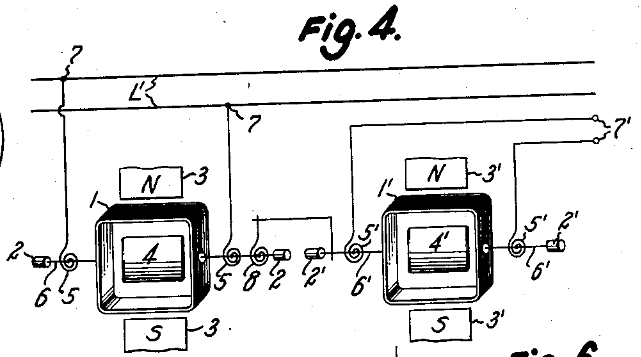
Fig. 4 is a schematic perspective view of a band pass filter according to the invention.

The selectivity curve may be given a flat top, which is appropriate for a bandpass filter, by coupling the instrument to a second mechanical system which is resonant at or near the frequency of natural resonance of the instrument. As shown in Fig. 4, the second mechanically resonant system is also a direct current-moving coil instrument, and, for convenience of description and analysis, the instruments are assumed to be of identical construction. Elements of the instrument constituting the first stage of the filter, i. e. the instrument at the left in Fig. 4, are idenified by the reference numerals of Fig. 1, and the corresponding elements of the instrument constituting the second stage are identified by the corresponding but primed numerals. The terminals 7, 7 of the coil 1 of the first instrument are connected to a transmission line L' of a power or communication system upon which supervisory signals of the sub-audio frequency may be imposed for the selective operation of various devices, not shown, which may be connected across the terminals 7', 7' of the coil 1' of the second instrument.

Figure 5:
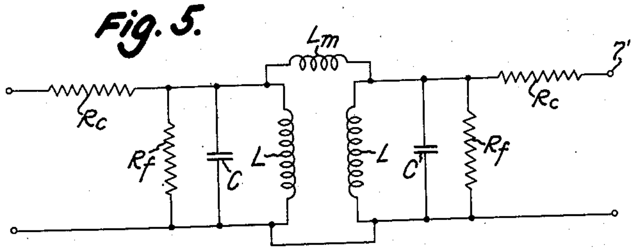
Fig. 5 is a diagram of the equivalent electrical network.

The moving systems are coupled mechanically by a spiral spring 8 having a compliance $U_m$ which is represented in the equivalent electrical network, Fig. 5, by the mutual inductance $L_m$. The electrical equivalent of each instrument is identical with the network of Fig. 2 since it is assumed that both instruments are identical with the Fig. 1 instrument. The elements of the equivalent electrical network of Fig. 5 are therefore identified by the corresponding characters of Fig. 2, but will not be described in detail.

The degree of coupling between the stages may be expressed as a coupling factor K:

$$K \equiv L/L_m \quad (10)$$

The selectivity characteristic of such a coupled circuit may be expressed as:

$$\frac{T_0}{T} = \left[\left[1 - \frac{Q^2\left(\frac{W}{W_0} - \frac{W_0}{W}\right)^2}{1 + K^2Q^2}\right]^2 + \left[\frac{2Q\left(\frac{W}{W_0} - \frac{W_0}{W}\right)}{1 + K^2Q^2}\right]^2\right]^{\frac{1}{2}} \quad (11)$$

wherein $T_0$ and T are the transmitted levels at frequencies $W_0$ and W respectively.

From Equation 11 it can be shown that when the coupling factor is equal or smaller than 1/Q, the selectivity curve has a single maximum peak occurring at $W = W_0$.

Figure 6:
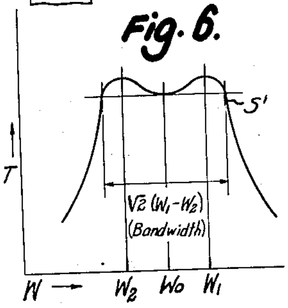
Fig. 6 is a graph showing the selectivity of the network.

But when K is larger than 1/Q, the selectivity curve T has maxima at two values of W. These peaks occur at $W_1$ and $W_2$, see Fig. 6, with their difference related to $W_0$ as:

$$\frac{W_1 - W_2}{W_0} = K\left[1 - 1/(KQ)^2\right]^{-\frac{1}{2}} \quad (12)$$

wherein KQ is the "coupling coefficient."

The condition where the single peak divides into two peaks appears when $$K = 1/Q, \text{ or } KQ = 1 \quad (13)$$

which condition is termed critical coupling.

Comparing the selectivity Equation 9 for a single circuit with Equation 11 for coupled circuits, it is apparent that two coupled circuits would have a considerably higher selectivity than either circuit used separately. Also, when the coupling coefficient KQ is somewhat larger than unity so that the double peaked condition is present but not excessive, the selectivity characteristic S' approximates a flat-topped pass band which is ideal for most purposes, see Fig. 6. Such a coupled system is known as a "bandpass filter" because of its relatively flat response over a range of frequency, with a sharp attention outside of the pass band range.

The factor $(W_1 - W_2)/W_0$ of Equation 12 is usually termed the "relative peak bandwidth." Or alternatively the practical working bandwidth may be considered as the width between the points on the selectivity curve that equal in level the point in the center of the curve at $W_0$. These points are separated farther apart than $W_1$ and $W_2$ by $\sqrt{2}$. These practical working bandwidths are usually the factors of interest and are termed the "relative bandwidth" and the "bandwidth" respectively.

$$\text{bandwidth} \equiv \sqrt{2}(W_1 - W_2) = W_0 K \left[ 2(1 - 1/K^2Q^2) \right]^{\frac{1}{2}} \quad (14)$$

$$\text{relative bandwidth} \equiv \sqrt{2}\left(\frac{W_1 - W_2}{W_0}\right) = K \left[ 2(1 - 1/K^2Q^2) \right]^{\frac{1}{2}} \quad (15)$$

These equations involving the equivalent electrical parameters 6, 7 and 10, may be converted to the mechanical parameters by substitution of 3, 4 and 5.

Equation 6 becomes:

$$Q \equiv R_f(UF^4/M)^{-\frac{1}{2}} \quad (16)$$

The losses are in practice still mostly electrical so $R_f$ remains an electrical parameter.

Likewise Equation 7 becomes:

$$W_0 \equiv (MU)^{-\frac{1}{2}} \quad (17)$$

and Equation 10 becomes:

$$K \equiv U/U_m \quad (18)$$

wherein $U_m$ is the compliance of the coupling spring.

The coefficients Q and K and the frequency factors are equally applicable to mechanics and electricity, and serve mainly to simplify expressions that would become unduly cumbersome by substitution. Equations 8, 9, and 11 to 15 are therefore considered as appropriate to mechanics by use of Q, K and $W_0$ as defined by Equations 16 through 18.

The transmission-frequency characteristic S′ as derived from the analysis of the equivalent electrical network is, by analogy, the oscillation amplitude-frequency characteristic of the coupled electrical instruments of Fig. 4. The coils 1, 1′ of the filter stages each have an undamped resonant frequency of oscillation $W_0$ which, by construction in accordance with the foregoing equations, is to be in the range of sub-audio frequencies, say 10 cycles per second or less if the filter is not housed in an evacuated envelope. The limits of the useful range of sub-audio frequencies have not been fully investigated but, from present knowledge of moving coil structures and frictional effects in permanent magnet-moving coil instruments as currently manufactured commercially, it would appear that the usable range extends from about 10 cycles per second down to about 0.1 cycle per second. At higher frequencies, air friction becomes serious, and at lower frequencies pivot friction becomes serious. This frequency range provides a relatively large number of signal channels as the instruments have relatively low frictional losses and thus a relatively high mechanical Q value which, in turn, provides a very narrow band width and high selectivity.

A plurality of sub-audio filters may therefore be provided upon a transmission line L to control various devices in accordance with supervisory signals of different sub-audio frequencies which are imposed upon the line by appropriate signal generators. The coil 1 of the first stage of each filter will respond, or be set into oscillation, only by signals of approximately its particular undamped resonant frequency $W_0$, and the oscillation of coil 1 will act through the coupling spring 8 to set the coil 1′ of the second filter stage into oscillation. The function of the second stage is, of course, to provide a second filtering which damps out the effects of low amplitude oscillations of the coil 1 by signals of frequencies adjacent, but outside of, the selected bandpass range. The oscillation of the coil 1′ within the magnetic field established by the permanent magnet 3′ generates an alternating current which is delivered to a tuned relay, not shown, connected across the output terminals 7′, 7′, the current being of a frequency within the bandpass range.

Figure 7:
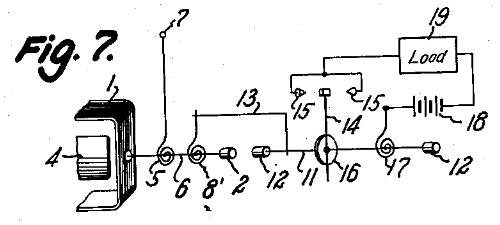
Fig. 7 is a schematic perspective view of a different type of second stage for the bandpass filter.

It is not essential that the second stage of the filter be a current generator for delivering a doubly-filtered electrical signal to a tuned relay. As shown in Fig. 7, the second filter stage may comprise a staff 11 supported in jewel bearings 12 in axial alinement with the bearings 2 of the coil 1 of the first filter stage, the staff having an arm 13 to which the outer end of a spiral spring 8′ on the staff of coil 1 is connected. The staff 11 carries a relay contact arm 14 for cooperating with stationary relay contacts 15, and a disc 16 of such mass that the spiral spring 17 which affords a current connection to the contact arm 14 tunes the moving system to the resonant frequency $W_0$ of the input instrument stage of the filter. The relay circuit includes a current source 18, indicated schematically as a battery, and a load device 19 connected between the stationary relay contacts 15 and the spring 17. The manner in which the relay responds only to sharply filtered signals of the sub-audio frequency $W_0$ will be apparent from the above explanation of the operation of the mechanically equivalent bandpass filter of Fig. 4.

It is to be understood that the invention is not limited to the apparatus as structurally and schematically illustrated, and as described. It is of course possible to employ magnetic core instruments in place of the external magnet instrument illustrated in Fig. 1, and the stages of the filter may be in mechanical parallel arrangement in place of the illustrated axial alinement. Additional stages may be provided for higher selectivity but, in general, two stages afford satisfactory selectivity, for practical purposes. These and other changes which may occur to those familiar with the design and construction of electrical filters fall within the spirit and scope of the invention as set forth in the following claims.

I claim:

1. In an electrical filter, the combination with a permanent magnet-moving coil intrument comprising a permanent magnet for establishing a magnetic field, a moving system including a coil supported for oscillation in said magnetic field in response to currents of sub-audio frequency therethrough, and spiral springs constituting current connections to said coil and tuning said moving system to mechanical resonance at a preselected sub-audio frequency; of a second moving system supported for oscillatory motion independently of said first moving system, spiral spring means tuning said second moving system to mechanical resonance at substantially said preselected frequency, and resilient means coupling said second moving system to said first moving system for actuation thereby, said second moving system comprising a coil movable in a unidirectional magnetic field, said spiral spring means constituting current connection to terminals across which an alternating voltage of substantially said preselected frequency is developed upon oscillation of said second moving system.

2. An electrical relay or repeater selectively responsive to an input voltage of a preselected frequency within a range of sub-audio frequencies to develop an output current of the preselected frequency, said relay or repeater comprising a pair of permanent magnet-moving coil instruments, each instrument including a moving system comprising a coil and spiral springs constituting current connection to the coil and tuning the moving systems each independently to mechanical resonance at the preselected frequency, pairs of input and output terminals to which said spiral springs of the respective instruments are connected, and a spiral spring connecting said moving systems.

3. The invention as recited in claim 2, wherein the compliance of said coupling spiral spring has a value which provides more than critical coupling between the moving systems.

ROSWELL W. GILBERT.

References Cited in the file of this patent

UNITED STATES PATENTS

| Number | Name | Date |
|---|---|---|
| 786,696 | Vreeland | Apr. 4, 1905 |
| 1,673,254 | Leeson | June 12, 1928 |
| 1,719,484 | Norton | July 2, 1929 |
| 2,112,560 | Davies | Mar. 29, 1938 |
| 2,184,321 | Soller | Dec. 26, 1939 |
| 2,560,257 | Sias | July 10, 1951 |
| 2,622,168 | Shields et al. | Dec. 16, 1952 |

FOREIGN PATENTS

| Number | Country | Date |
|---|---|---|
| 580,388 | Great Britain | Sept. 5, 1946 |

OTHER REFERENCES

Terman Radio Engineering (Third edition), 1947, pp. 58–65, 69 and 70.